United States Patent

Bogdanov et al.

[11] 3,890,557
[45] June 17, 1975

[54] DEVICE FOR SETTING UP ARC CURRENT IN PULSED ARC WELDING

[76] Inventors: Georgy Yakovlevich Bogdanov, ulitsa Gavrskaya 4, kv. 71; Jury Andreevich Deminsky, ulitsa Lenina 44, kv. 1; Mikhail Isaakovich Zax, ulitsa Shkolnaya 3, kv. 4; Jury Viktorovich Tsygankov, ulitsa vavilovykh 11/3, kv. 118, all of Leningrad, U.S.S.R.

[22] Filed: Nov. 13, 1973

[21] Appl. No.: 415,380

[52] U.S. Cl. ............ 321/16; 219/135; 323/43.5 S; 323/85
[51] Int. Cl. ............................................ B23k 9/06
[58] Field of Search .................. 323/43.5 S, 45, 85; 321/10, 16, 20, 21, 24; 219/131 WR, 131 R, 135

[56] References Cited
UNITED STATES PATENTS

| | | | |
|---|---|---|---|
| 3,231,711 | 1/1966 | Gibson et al. | 321/10 |
| 3,356,928 | 12/1967 | Parrish | 321/21 |
| 3,440,395 | 4/1969 | Rebuffoni et al. | 219/131 WR |
| 3,473,103 | 10/1969 | Schaedel | 321/16 |
| 3,568,032 | 3/1971 | Mages et al. | 321/24 |
| 3,588,466 | 6/1971 | Daggett | 219/131 R |
| 3,711,058 | 1/1973 | Weman | 219/131 NR |
| 3,781,637 | 12/1973 | Potter | 321/10 |

FOREIGN PATENTS OR APPLICATIONS

| | | | |
|---|---|---|---|
| 276,289 | 10/1970 | U.S.S.R. | 219/131 R |
| 46-9412 | 3/1971 | Japan | 219/131 WR |

*Primary Examiner*—William H. Beha, Jr.

[57] ABSTRACT

A device for setting up an arc current in pulsed arc welding comprising a rectifier and a choke connected at the rectifier output and adapted for smoothing pulsations of rectified current, said device being characterised in that it is fitted with a controllable valve connected in parallel with said choke and shunting it within a pre-set period of pulsation of the rectified current voltage with a delay as to the commencement of the rectified current voltage pulsation period.

3 Claims, 10 Drawing Figures

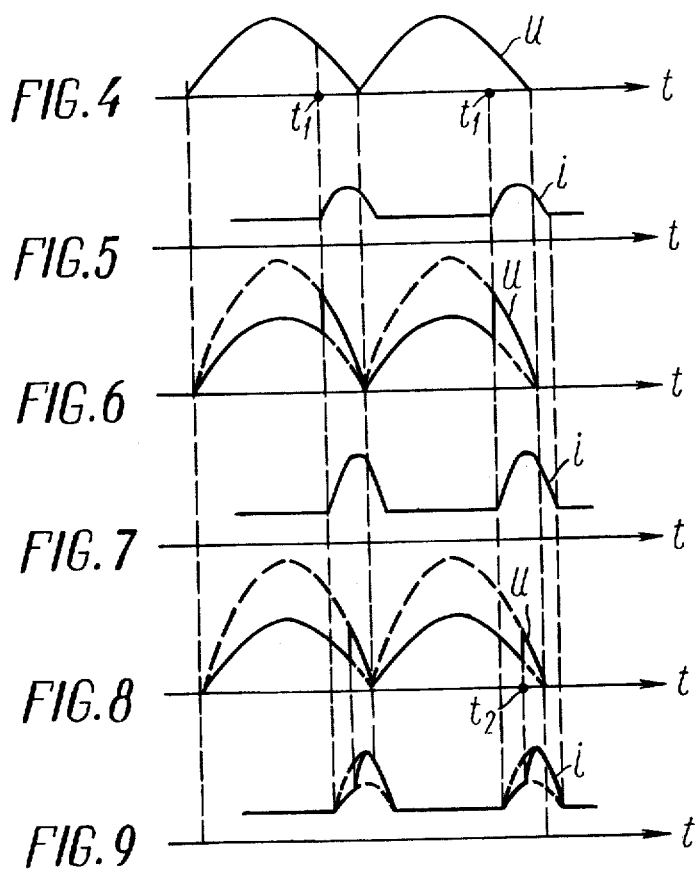

DEVICE FOR SETTING UP ARC CURRENT IN PULSED ARC WELDING

The present invention relates to the field of electric-arc welding and, more particularly, to devices for setting up an arc current in pulsed arc welding.

The devices utilized at present for pulsed arc welding comprise two power sources: a background current source and a pulse current source operating in parallel to a common load, namely, to a welding arc.

Regarding the background current source, usually use is made of a generator or a rectifier of a direct smoothed current.

As to the pulse current source, provision is made for either a rectifier operating at an intermittent duty or a source whose operation an arc discharge being obtained from a preliminary charged capacitor discharging through a controllable valve.

A disadvantage of the known devices is that they are bulky and economically unexpedient in view of the use of two power sources. Moreover, during the passage of the current pulses the background current source is partly or completely cut off owing to surges in arc voltage causing dips in the background current curve after the passage of the pulse.

With the background current of a small magnitude the presence of such dips in the current curve may lead to a disturbance in arcing stability in welding materials of small thicknesses.

Also known is a rectifier circuit with a pulsating rectified current voltage, wherein the pulses of the rectified current are smoothed by making use of a smoothing choke connected at the output of the rectifier in a rectified current circuit.

The thus-made rectifier, in its known embodiment, is unsuitable for pulsed arc welding.

The object of the present invention is to provide a device for setting up an arc current in pulsed arc welding which would comprise a single source for generating both the background and pulse currents and would make it possible to obviate dips in the resultant current curve.

Said object is accomplished by the fact that a device for setting up an arc current in pulsed arc welding comprising a rectifier and a choke connected at the rectifier output and adapted for smoothing pulsations of the rectified current, according to the invention, is fitted with a controllable valve connected in parallel with said choke and shunting it within a present pulsation period of the rectified current voltage with a delay as to the commencement of the rectified current voltage pulsation period.

It is expedient that the device for setting an arc current in pulsed arc welding be made so as to include additional controllable valves connected at the rectifier input and enabling the rectified pulsating current voltage to be augmented for the rest of the rectified current voltage pulsation period concurrently with the shunting of said choke.

It would be also expedient that a delay element be coupled to steering outputs of said additional controllable valves so that the rectified pulsating current voltage be augmented with a delay as to the instant said choke is shunted.

The herein-proposed device for setting up an arc current in pulsed arc welding ensures: 1. Absence of dips in the arc current curve after the current pulse passage whereby both the stability of the welding process and quality of the weld being moulded are enhanced. 2. Separate regulation within broad ranges of main parameters of welding conditions, such as: the magnitude of background current, pulse amplitude and duration. 3. A 50–80% reduction in weight, overall dimensions and cost and improvement in operating conditions. 4. The possibility of extensive application of pulsed arc welding with a consumable electrode for joining together steels and non-ferrous metals, particularly, of small thicknesses varying from 1 to 3mm.

The invention is further exemplified by a detailed description of specific embodiments thereof, to be had in conjunction with the accompanying drawings, wherein:

FIG. 4 shows a curve of the rectified pulsating current voltage;

FIG. 5 shows a curve of the resultant current;

FIG. 6 depicts a curve of the pulsating rectified current voltage at augmentation of the rectifier voltage achieved simultaneously with the shunting of the choke by a controllable valve;

FIG. 7 is a curve of the resultant current at augmentation of the rectifier voltage achieved simultaneously with the shunting of the choke by a controllable valve;

FIG. 8 shows a curve of the pulsating rectified current voltage at augmentation of the rectifier voltage with a delay in relation to the instant of the choke shunting;

FIG. 9 shows a curve of the resultant current at augmentation of the rectifier voltage achieved with a delay as to the instant of the choke shunting.

Figure 1:
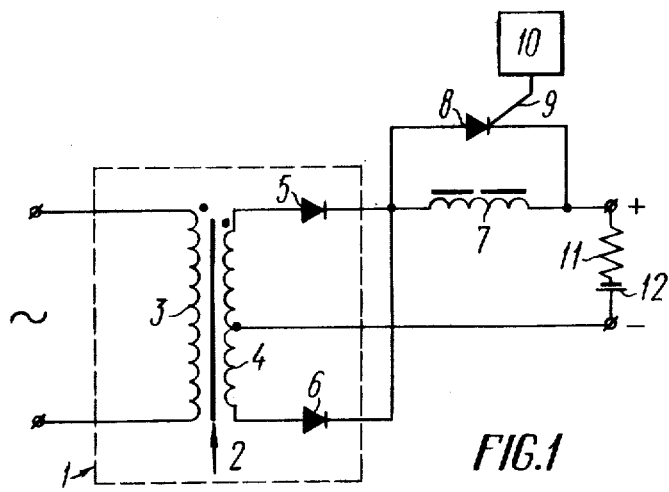
FIG. 1 shows an electric circuit of the device for setting up an arc current in pulsed arc welding, according to the invention (first version).

A device for setting up an arc current in pulsed arc welding comprises a rectifier 1 (FIG. 1) which is a power transformer 2 with a primary winding 3 and a secondary winding 4 with a midpoint tap. The beginnings of the windings 3 and 4 are shown by dots in FIG. 1. Rectifying is achieved by non-controllable valves 5 and 6. Thus, the rectifier is made according to a single-phase zero rectifying circuit. Connected to an output of the rectifier 1 is a smoothing choke 7 adapted to smooth pulses of the rectified current. In parallel with the smoothing choke 7 is connected a controllable valve which is a thyristor 8. Control pulses are to a steering output 9 of the thyristor 8 from a steering circuit 10. The steering circuit 10 may be any conventional circuit of a control pulse source incorporating a phase-shifting element. The load — a welding arc — is constituted by a series-connected resister 11 and a counter e.m.f. (an element 12) coupled to the output of the rectifier 1.

Figure 2:
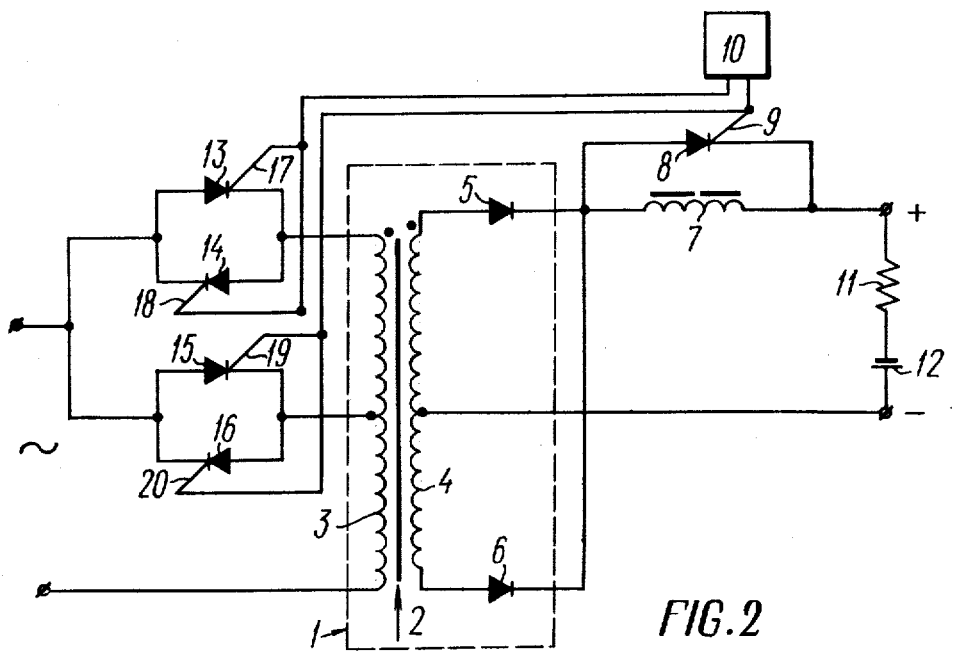
FIG. 2 depicts an electric circuit of the device for setting up an arc current in pulsed arc welding, according to the invention (second version)

A device for setting up an arc current in pulsed are welding envisaged by the second version and illustrated in FIG. 2 comprises essentially the same elements as that shown in FIG. 1, with the functions of rectifying and regulation performed separately. Rectifying is effected, as in the first version, by the non-controllable valves 5 and 6, whereas phase control is by controllable valves — thyristors 13 and 14 connected in parallel with each other to the beginning of the primary winding 3. The primary winding 3 has a tap to enable stepwise variation of the ratio of the transformer 2. The stepwise variation of the transformation ratio is effected with a view to augmenting the rectified current voltage with the help of controllable valves — thyristors 15 and 16, paralleled to each other and coupled to the thyristors 13 and 14 and to the tap of the primary winding 3. Steering outputs 17 and 18 of the thyristors 13 and 14 as well as steering outputs 19 and 20 of the thyristers 15 and 16 are coupled to the steering circuit 10.

A device for setting up an arc current in pulsed arc welding contemplated in accordance with the third version differs from that disclosed in the second version in that a delay element 21 is connected between the steering circuit 10 and steering outputs 19 and 20 of the thyristors 15 and 16.

Figure 10:
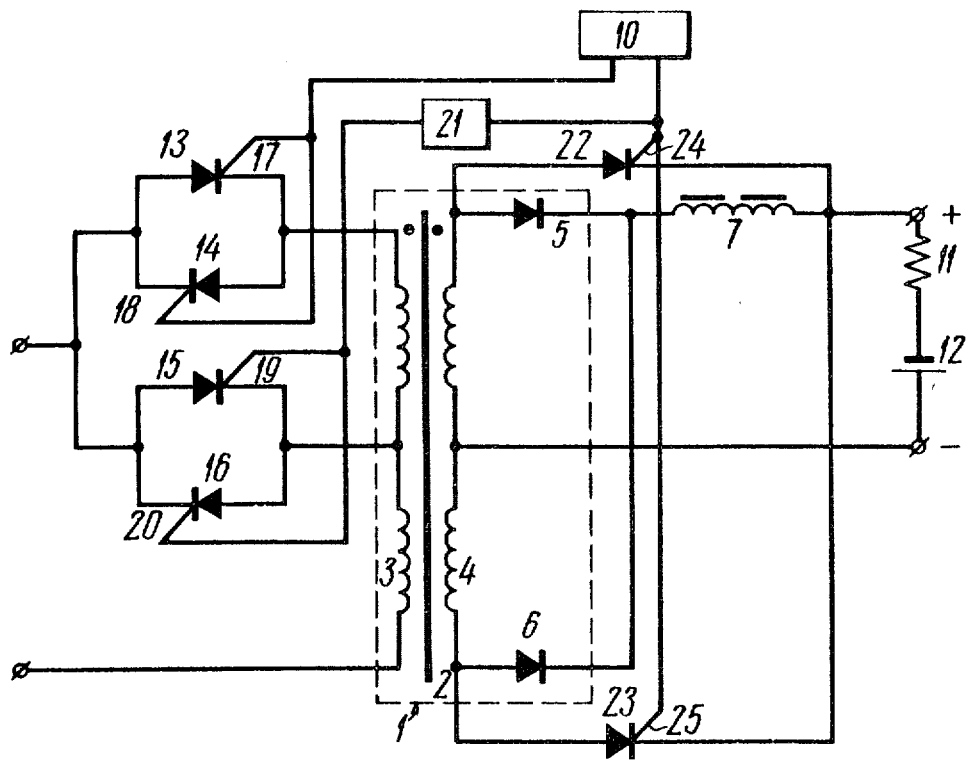
FIG. 10 depicts an electric circuit of the device for setting up an arc current in pulsed arc welding, according to the invention (fourth version).

A device for setting up an arc current in pulsed arc welding contemplated in the fourth version thereof, with a view to removing current loads from diodes 5 and 6 (FIG. 10), employs shunting the choke 7 together with the diodes 5 and 6 of a corresponding phase. The pulsed component of the current does not pass through the diodes 5 and 6.

The device for setting up an arc current in pulsed arc welding operates in the following manner.

Figure 3:
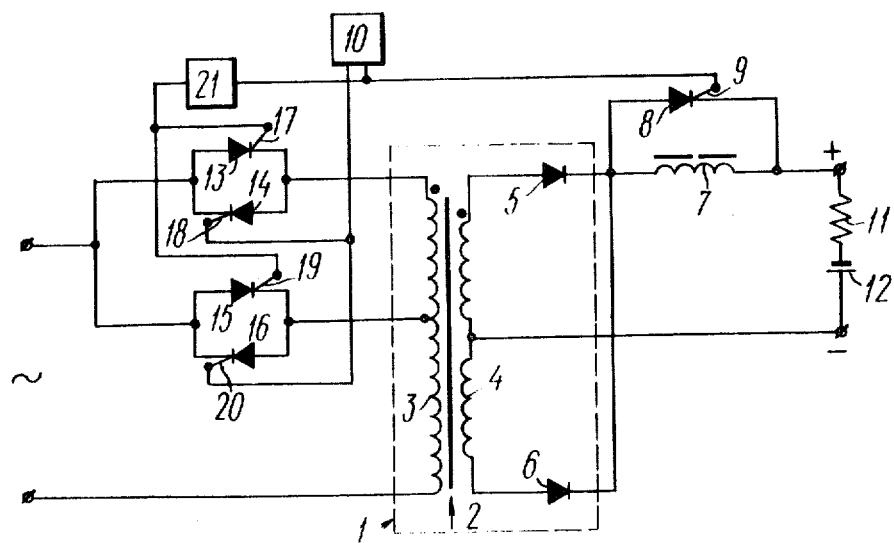
FIG. 3 is an electric circuit of the device for setting up an arc current in pulsed arc welding, according to the invention (third version)

As long as the thyristor 8 (FIG. 3) is not energized, a direct current smoothed by the choke 7 will flow through a welding circuit under the effect of pulsating voltage U (FIG. 4) of the rectifier 1 (FIG. 3). With a pre-set inductance of the choke 7 and given load parameters, the current magnitude is dependent on the phase in which the thyristors 13 and 14 are connected. As a pulse is sent out from the steering circuit 10 to the steering output 9 of the thyristor 8, the latter starts conducting and shunts the choke 7 with a delay as to the commencement of the pulsation period of the rectified current voltage U. As a result, a current pulse 1 is shaped (FIG. 5) in the welding circuit under the influence of the rectified pulsating current voltage U (FIG. 4).

While the choke 7 (FIG. 3) is shunted by the thyristor 8, a current difference passes through the latter, namely: the difference between the pulse and free discharge current of the choke 7 flowing through the circuit "choke 7 — thyristor 8". Damping of this circuit is very small, and the current carried by the choke 7 will practically remain unchanged within the length of time required for the passage of the pulse current, being equal to the magnitude of the background current before the pulse. At the end of the pulsation period of the voltage of the rectifier 1 the current difference flowing through the thyristor 8 will become zero, the thyristor 8 will be thrown out of conduction and the background current sustained by the choke 7 will pass through the load.

The current pulse repetition frequency depends on the frequency of shunting of the choke 7 by the thyristor 8 being equal to or an integer fraction of the pulse repetition frequency of the rectified current voltage.

The pulse amplitude and duration depend on the phase in which the thyristor 8 shunting the choke 7 is energized with respect to the commencement of pulsation of the rectified current voltage.

For obtaining current pulses of large amplitudes with a low background current the pulsating voltage of the rectifier 1 is augmented (FIG. 6) simultaneously with the shunting of the choke 7 by the thyristor 8. This is effected by feeding pulses to the thyristors 15 and 16 from the steering circuit 10. In this case a voltage of opposite polarity is applied across the thyristors 13 and 14 and the latter are thrown out of conduction. Under the effect of the augmented rectified pulsating current voltage U (FIG. 6) a current pulse i of a larger amplitude is set up (FIG. 7).

The amplitude of pulse current is adjusted irrespective of its duration by triggering a delay element 21 (FIG. 3). In this case the choke 7 is shunted by feeding a pulse from the steering circuit 10 to the steering output 9 of the thyristor 8 in a hereinbefore-described manner whereupon the thyristor 15 operates with a certain delay as to the shunting of the choke 7 caused by the passage of the pulse through the delay element 21. This results in a rectified pulsating current voltage U (FIG. 8) augmentation. Under the effect of the augmented rectified pulsating current voltage U (FIG. 8) a current pulse i is shaped in the welding circuit.

What we claim is:

1. A device for setting up an arc current in pulsed arc welding comprising: a rectifier; a choke connected to the output of said rectifier and adapted for smoothing pulsations of rectified current; a controllable valve connected in parallel to said choke and shunting said choke within a pre-set period of pulsation of the rectified current voltage with a delay as to the commencement of the rectified current voltage pulsation period.

2. A device for setting up an arc current in pulsed arc welding comprising: a rectifier; a choke connected to the output of said rectifier and adapted for smoothing pulsations of said rectified current; a controllable valve connected in parallel to said choke and shunting said choke within a pre-set period of pulsation of the rectified current voltage with a delay as to the commencement of said pulsation period of said rectified current voltage; additional controllable valves connected to the input of said rectifier and enabling augmentation of said rectified current voltage concurrently with said shunting of said choke for the rest of the pulsation period of said rectified current voltage.

3. A device for setting up an arc current in pulsed arc welding of claim 2, wherein a delay element is connected to steering outputs of said additional controllable valves by which virtue said rectified pulsating current voltage is augmented with a delay as to the shunting of said choke.

* * * * *